(12) United States Patent
Busey et al.

(10) Patent No.: US 12,436,800 B1
(45) Date of Patent: Oct. 7, 2025

(54) SYSTEMS AND METHODS FOR GENERATING A PROVENANCE RECORD FOR PROCESSING INFORMATION IN ACCORDANCE WITH A COMPUTATIONAL WORKFLOW

(71) Applicant: Form Bio Inc., Austin, TX (US)

(72) Inventors: Andrew Busey, Austin, TX (US); Joseph Charles Nipko, Boulder City, NV (US); Brandi Lynn Cantarel, Richardson, TX (US); Douglas James Daniels, Jr., Austin, TX (US)

(73) Assignee: Form Bio Inc., Austin, TX (US)

( * ) Notice: Subject to any disclaimer, the term of this patent is extended or adjusted under 35 U.S.C. 154(b) by 789 days.

(21) Appl. No.: 17/733,652

(22) Filed: Apr. 29, 2022

(51) Int. Cl.
G06F 9/48 (2006.01)
G06Q 10/06 (2023.01)
G06Q 10/0633 (2023.01)

(52) U.S. Cl.
CPC ........... *G06F 9/4881* (2013.01); *G06Q 10/06* (2013.01); *G06Q 10/0633* (2013.01)

(58) Field of Classification Search
None
See application file for complete search history.

(56) References Cited

PUBLICATIONS

Kanwal et al., "Investigating reproducibility and tracking provenance—A genomic workflow case study", 2017, BMC Bioinformatics. (Year: 2017).*
Kahn et al., "Sharing interoperable workflow provenance: A review of nest practices and their practical application in CWLProv", Jul. 2019, Oxford University Press. (Year: 2019).*
Yuan et al., "Utilizing Provenance in Reusable Research Objects", Mar. 8, 2018, Informatics. (Year: 2018).*
Oliveira et al., "Provenance Analytics for Workflow-Based Computational Experiments: A Survey", May 2018, ACM Computing Surveys. (Year: 2018).*
Lifschitz et al., "Dealing with Reusability and Reproducibility for Scientific Workflows", 2011, IEEE International Conference on Bioinformatics and Biomedicine Workshops. (Year: 2011).*

* cited by examiner

*Primary Examiner* — Qing Yuan Wu
(74) *Attorney, Agent, or Firm* — Esplin & Associates, PC

(57) ABSTRACT

System and method for generating a provenance record for processing information in accordance with a computational workflow are disclosed. Exemplary implementations may: store workflow definitions and computational modules; receive user entry or selection indicating a first computational workflow and a first input information set; processing the first input information set in accordance with the first computational workflow to generate a first output information set; determine provenance information for processing the first input information set in accordance with the first computational workflow; aggregating the provenance information to generate a provenance record; outputting or storing the provenance record; and/or other exemplary implementations.

20 Claims, 4 Drawing Sheets

SYSTEMS AND METHODS FOR GENERATING A PROVENANCE RECORD FOR PROCESSING INFORMATION IN ACCORDANCE WITH A COMPUTATIONAL WORKFLOW

FIELD OF THE DISCLOSURE

The present disclosure relates to systems and methods for generating a provenance record for processing information in accordance with a computational workflow.

BACKGROUND

Bioinformatics programs for processing genomic information are known (e.g., performing analyses, converting files, etc.). Data management systems are known. By way of non-limiting illustration, data management systems may allow tracking of data origins, creating of data logs, etc.

SUMMARY

Processing information, particularly genomic information, may require multiple executions of a program or different programs (i.e., a computational workflow) to achieve the desired output. The multiple executions may include varying orders of programs, inputs, input parameters, and/or other information to generate the output. Users may want to store information related to the execution/processing of information in a format that is modular, shareable, and/or allows for replication of the execution. Users may want to store the information in a format that allows for replication of the executions to generate the same output or allow for inspection of the executions. One or more aspects presented herein aim to provide solutions for gathering, aggregating, and storing information associated with the execution of a computational workflow.

One or more aspects of the present disclosure include a system for generating a provenance record for processing information in accordance with a computational workflow. The system may include electronic storage, one or more hardware processors configured by machine-readable instructions, and/or other components. Executing the machine-readable instructions may cause the one or more hardware processors to facilitate generating a provenance record for processing information in accordance with a computational workflow. The machine-readable instructions may include one or more computer program components. The one or more computer program components may include one or more of an input component, a workflow component, a record component, an output component, and/or other components.

The electronic storage may be configured to store pipeline definitions, computational modules, and/or other information. The pipeline definitions may define computational pipelines that process sets of input information to produce sets of output information. The individual pipeline definitions may include orders of computational modules for the defined computational pipelines. The computational modules may define separate sets of computational operations that are executable on module inputs to the computational modules to produce module outputs. The computational modules may include a first computational module, a second computational module, and/or other computational modules. The pipeline definitions may include a first pipeline definition that defines a first computational pipeline, and/or other pipeline definitions. The first pipeline definition may define an order of computational modules that specifies the second computational module is subsequent and adjacent to the first computational module in the first computational pipeline. Module outputs generated by the first computational module in the first computational pipeline may be provided as module inputs to the second computational module.

The input component may be configured to receive user entry or selection indicating the first computational workflow, a first input information set, and/or other information. The first computational module of the first computational workflow may define a first set of operations to perform on module input to the first computational module. The second computational module of the first computational workflow may define a second set of operations to perform on module input to the second computational module.

The workflow component may be configured to process the first input information set in accordance with the first computational workflow to generate a first output information set. Processing may include a first processing step, a second processing step, and/or other processing steps. The first processing step may include providing the first input information set as module input to the first computational module to perform the first set of operations to produce first module output. The second processing step may include providing the first module output as module input to the second computational module to perform the second set of operations to produce second module output. The first output information set may include the second module output, and/or information derived thereof. The first output information set may be provided as output for the first computational workflow.

The record component may be configured to determine provenance information for processing the first input information set in accordance with the first computational workflow. The provenance information may specify the first processing step followed by the second processing step, and/or other information. The provenance information may include one or more of the first input information set, the first output information set, the first module output, the second module output, and/or other information.

The record component may be configured to aggregate the provenance information to generate a provenance record. The provenance record may be capable of facilitating replication of processing the first input information set in accordance with the first computational workflow to generate the first output information set.

The output component may be configured to output and/or store the provenance record. The provenance record may be stored in a machine readable format, a human readable format, and/or other types of formats.

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
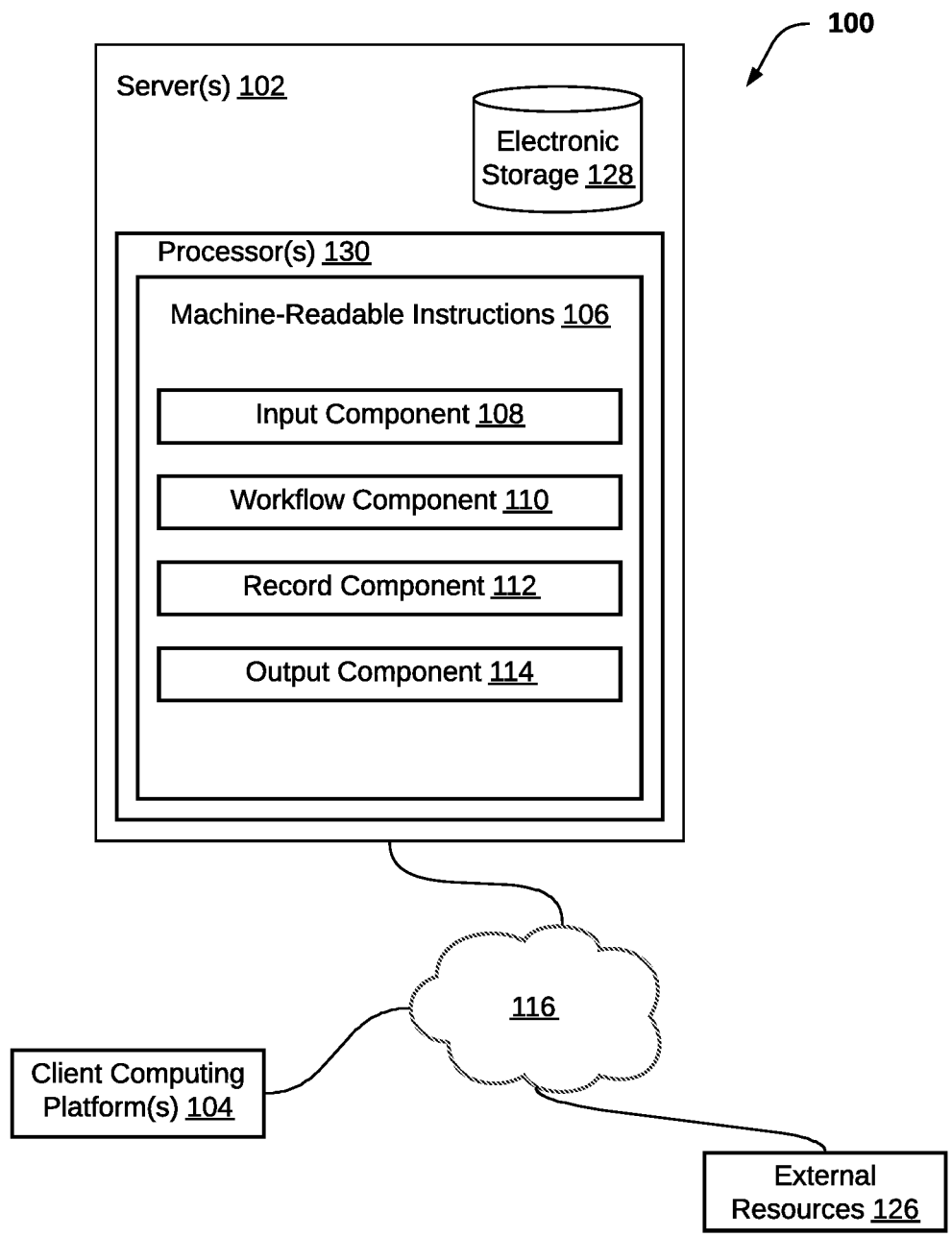
FIG. 1 illustrates a system for generating a provenance record for processing information in accordance with a computational workflow, in accordance with one or more implementations.

FIG. 1 illustrates a system 100 configured for generating a provenance record for processing information in accordance with a computational workflow, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of input component 108, workflow component 110, record component 112, output component 114, and/or other instruction components.

Electronic storage 128 may be configured to store workflow definitions, computational modules, and/or other information. The workflow definitions may define computational workflows that process sets of input information to produce sets of output information. The individual workflow definitions may include orders of computational modules for the defined computational workflows. The computational modules may define separate sets of computational operations capable of being performed on module inputs to the computational modules to produce module outputs. The computational modules may include a first computational module, a second computational module, and/or other computational modules. The workflow definitions may include a first workflow definition that defines a first computational workflow, and/or other workflow definitions. The first workflow definition may define an order of computational modules that specifies the second computational module is subsequent and/or adjacent to the first computational module in the first computational workflow. Module outputs generated by the first computational module in the first computational workflow may be provided as module inputs to the second computational module. In some implementations, computational modules of a set of computational modules may be functionally analogous. Computational modules that are functionally analogous may produce outputs having the same output format, and/or outputs sharing other characteristics. Computational modules that are functionally analogous may define separate sets of computational operations that perform the same calculations in a different order, perform the same functions using different calculations, and/or other variations. In some implementations, outputs produced by computational modules that are functionally analogous may also be functionally analogous. By way of non-limiting illustration, a first output including a first genomic sequence may be produced by a first computational module and a second output including a second genomic sequence may be produced by a second computational module. The first genomic sequence and the second genomic sequence may be functionally analogous by virtue of the first computational module and the second computational module being functionally analogous. The first genomic sequence and the second genomic sequence being functionally analogous may indicate the first genomic sequence and the second genomic sequence result in production of the same compounds during a manufacturing process (e.g., protein synthesis).

The first computational module of the first computational workflow may define a first set of operations to perform on module input to the first computational module. The second computational module of the first computational workflow may define a second set of operations to perform on module input to the second computational module. The different computational modules may have different input format requirements for module inputs for the individual computational modules. Inputs that do not satisfy the input format requirements of a computational module may not be capable of being processed by the computational module (i.e., sets of operations may not be performed on the module input). Input format requirements may include a required file format (e.g., FASTQ, FASTA, BAM, etc.), a required data format, required file information (e.g., indexing information, quality score information, etc.), and/or other requirements. The separate sets of computational operations defined by the individual computational modules may produce module outputs having different output formats. In some implementations, the computational module may be configured to convert the input information set from an input format to an output format. An input of a computational module may include the same or similar information in a different format (i.e. data format, file format, etc.) as the output of the computational module. By way of non-limiting illustration, a computational module may define separate sets of computational operations for converting an input file of a BAM format to produce an output of a FASTQ format.

Input component 108 may be configured to receive user entry or selection indicating the first computational workflow, a first input information set, and/or other information. User entry may include a user uploading one or more electronic files via one or more client computing platform(s) 104 associated with the user. The one or more electronic files may include genomic information (e.g., genomic sequences), biological data, and/or other information. The one or more electronic files be a FASTA file, FASTQ file, BAM file, SAM file, BAS file, and/or other file types. The input information set may include indexing information, quality score information, and/or other information pertaining to the genomic information included in the input information set. In some implementations, the input information set may be obtained from an external database via one or more network(s) 116, external resources 126, and/or other components of system 100. Input information sets obtained from an external database may be reconfigured (i.e., reformatted) by input component 108 in order to facilitate compatibility with system 100. In some implementations, the user may select an input information set from multiple provided input information sets. By way of non-limiting illustration, the user may access a user interface via client computing platform(s) 104. The user interface may show one or more user interface elements associated with one or more individual input information sets capable of being selected. The user interface elements may include drop-down menus, widgets, buttons, tabs, and/or other types of user interface elements. Selection and/or entry of an input information set may facilitate processing of the selected input information set in accordance with one or more computational workflows.

In some implementations, user entry and/or selection may indicate a computational workflow to be used to process the input information set. User entry may select a computational workflow from multiple provided computational workflows. The multiple provided computational workflows may be stored in electronic storage 128, obtained from external resources 126, and/or obtained from other components of system 100. User entry may identify one or more computational modules and/or a relative order for the one or more computational modules. The computational modules and/or the relative order for the one or more computational modules may be used to configure a computational workflow.

In some implementations, input component 102 may be configured to receive user input indicating preference information associated with the computational workflow, workflow output, computational modules, provenance information, provenance record, and/or other information. Preference information may define criteria to be satisfied for the outputs of the computational workflow, information to be included in the provenance record, and/or other information. By way of non-limiting illustration, prospective final outputs of the computational workflow that satisfy the criteria of the preference information may be provided to the user as final output. Prospective final outputs that do not satisfy the criteria of the preference information may not be provided to the user as final output and/or flagged for failure to satisfy the criteria. Criteria may include one or more thresholds for values and/or features associated with the prospective final outputs of the computational workflow. By way of non-limiting illustration, criteria may include a threshold for a quality score (i.e., a confidence score) associated with a prospective final output of the computational workflow. Prospective final outputs having individual quality scores that to not meet or exceed the threshold may not be provided as final outputs for the computational workflow, based on the criteria.

Workflow component 110 may be configured to configure a computational workflow to process the input information set and/or other information. In some implementations, the computational workflow may be configured according to user input specifying information associated with the computational workflow. By way of non-limiting illustration, user input may indicate an order of workflow stages, one or more computational modules for individual ones of workflow stages, an order for the one or more computational modules, and/or other information. In some implementations, a computational workflow may be configured in accordance with one or more of a workflow input format and/or a workflow output format specified by the user. By way of non-limiting illustration, user input may specify a first workflow input format and a first workflow output format. A first computational workflow may be configured such that the input format of the first computational workflow is the first workflow input format, and the output format of the first computational workflow is the first workflow output format. In some implementations, a computational workflow may be configured according to one or more workflow definitions and/or other information. Workflow definitions may be stored in electronic storage 128, external resources 126, and/or obtained via networks 116. A workflow definition may define one or more sets of computational modules, order of computational modules, and/or other information associated with a computational workflow. The workflow definition may define input format(s) and/or output format(s) for the computational workflow and/or individual computational modules included in the computational workflow.

Workflow component 110 may be configured to process the first input information set in accordance with the first computational workflow to generate a first output information set. Processing may include a first processing step, a second processing step, and/or other processing steps. The second processing step may be subsequent to the first processing step. The first processing step may include providing the first input information set as module input to the first computational module to perform the first set of operations to produce first module output. The second processing step may include providing the first module output and/or information derived from the first module output as module input to the second computational module to perform the second set of operations to produce second module output. In some implementations, second module output may include multiple sets of outputs that are capable of being selected as output for the first computational workflow. By way of non-limiting illustration, input component 108 may be configured to receive user input selecting a set of output from the multiple sets of output included in the second module output. The selected set of output from the second module output may be included in the first output information set (i.e., provided as final output for the first computational workflow). In some implementations, the first output information set may include the second module output, and/or information derived thereof.

In some implementations, the first computational workflow may be configured to transform, convert, perform analyses, and/or perform other functions on input to the first computational workflow. By way of non-limiting illustration, the first computational workflow may define one or more computational modules for converting input of a first format to produce output of a second format. The first input information set may be configured in the first format and/or the first output information set may be configured in the second format.

Record component 112 may be configured to determine provenance information for processing the first input information set in accordance with the first computational workflow. The provenance information may specify the first processing step followed by the second processing step. The provenance information may include at least the first input information set, the first output information set, the first module output, the second module output, and/or other information. In some implementations provenance information may be determined based on user entry received by input component 108. By way of non-limiting example, user entry may specify types of information to be included in the provenance information and/or provenance record. Types of information may include information related to first input information set, first output information set, first computational workflow, and/or other information associated with processing the first input information set in accordance with the first computational workflow. In some implementations, provenance information may indicate errors that occur during processing of the first input information set in accordance with the first computational workflow. Errors may include invalid (i.e., unwanted, inaccurate) outputs, incomplete processing, and/or other types of errors. In some implementations, provenance information may indicate locations where the errors occur. By way of non-limiting illustration, provenance information may indicate one or more errors occurring at the first processing step and/or the second processing step. Provenance information indicating errors may allow a user to inspect and/or remedy the errors in later executions of the first computational workflow.

Record component 112 may be configured to aggregate the provenance information to generate a provenance record. The provenance record may be capable of facilitating replication of processing the first input information set in accordance with the first computational workflow to generate the first output information set. The provenance record may be stored in an executable file, a document file, and/or other types of file formats. By way of non-limiting illustration, the provenance record stored in an executable file may be capable of being executed to replicate processing of the first input information set in accordance with the first computational workflow in order to produce the first output information set. Executions of the provenance record (subsequent to the generation of the provenance record) may be recorded and/or appended to the provenance record. In some implementations, the provenance record stored in an executable file may be adjusted (i.e., edited, changed, modified) prior to execution of the provenance record. Adjustments to the provenance record may include modifications to the first input information set, the first computational workflow, the order of computational modules defined by the first computational workflow, and/or other information associated with the provenance record.

In some implementations, the provenance record may be stored in a document file and/or in a human-readable format. The provenance record may provide a given user with information to facilitate replicating (i.e., reproducing, duplicating) processing the first input information set in accordance with the first computational workflow. By way of non-limiting illustration, the provenance record may indicate options (e.g., input information sets, computational workflows, computational modules, etc.) for user entry and/or selection. The user entry and/or selection of the indicated options may result in processing the first input information set in accordance with the first computational workflow to produce the first output information set.

In some implementations, the provenance record may include permissions information, version information, and/or other information. Permissions information may be associated with the first input information set, the first output information set, the first workflow definition defining the computational workflow, individual ones of the computational workflow, and/or other components of the computational workflow. In some implementations, the permissions information may be received by user entry and/or selection via input component 108. Permissions information associated with a given component of the computational workflow may define a user's and/or a system's accessibility to the given component. Permissions information may include permissions statuses, acceptable user identifications (e.g., passwords, licenses, etc.), acceptable group identifications (e.g., group identification number), privacy settings, and/or other information. Permissions statuses may include read-only, read-write, execute, and/or other types of permissions.

In some implementations, permissions information may include ownership information, author information, and/or other types of information. By way of non-limiting illustration, ownership information associated with a computational module and/or computational workflow may indicate a user having specific ownership permissions. Version information included in the provenance record may be associated with one or more of the first computational workflow, the first computational module, the second computational module, and/or other information associated with processing the first input information set in accordance with the first computational workflow. Version information may include a version number, group number, directory number, and/or other information. By way of non-limiting illustration, a computational workflow having a version number of two may indicate modifications have been made to a previous computational workflow having a version number of one.

In some implementations, the provenance record, the first computational workflow, the first input information set, the first output information set, and/or other information may be provided as training data to train a machine learning model. The training data may be provided to train the machine learning model to generate one or more provenance records for processing of other input information sets in accordance with one or more other computational workflow. In some implementations, the machine learning model may take one or more of a computational workflow, a workflow input, a workflow output, and/or other information as input. The machine learning model may be used by record component 112 to generate a provenance record as output based on input to the machine learning model. The provenance record may be associated with the input to the machine learning model. The trained machine learning model may be stored in electronic storage 128, obtained via network(s) 116, and/or obtained from other components of system 100.

In some implementations the machine learning model may be trained using one or more of supervised learning, semi-supervised learning, unsupervised learning, reinforcement learning, and/or other techniques. In supervised learning, the model may be provided with known training dataset that includes desired inputs and outputs, and the model may be configured to find a method to determine how to arrive at those outputs based on the inputs. The model may identify patterns in data, learn from observations, and make predictions. The model may make predictions and may be corrected or validated by an operator—this process may continue until the model achieves a high level of accuracy/performance. Supervised learning may utilize approaches including one or more of classification, regression, and/or forecasting. Semi-supervised learning may be similar to supervised learning, but instead uses both labelled and unlabeled data. Labelled data may comprise information that has meaningful tags so that the model can understand the data, while unlabeled data may lack that information. By using this combination, the machine learning model may learn to label unlabeled data.

Output component 112 may be configured to output and/or store the provenance record. The provenance record may be stored in electronic storage 128 and/or other components of system 100. The provenance record may be stored in a newly generated file, added (i.e., appended) to an existing file, and/or other methods of storage. In some implementations, the provenance record may be stored as a JSON file, CSV file, Protocol Buffers file, ORC file, RDBMS file, XML file, LDAP file, and/or other file formats. In some implementations, the provenance record and/or the first output information set may be stored and/or associated with one or more key-value pairs. The key-value pairs may be stored as ASCII strings, binary strings, and/or other methods. The key-value pairs may be stored in electronic storage 128. The key-value pairs may indicate the provenance record includes information related to the first output information set and/or related to processing the first input information set in accordance with the first computational workflow. By way of non-limiting illustration, the provenance record may include (or may be associated with) a key and/or other information. The provenance record key may be provided as input to a hash function to output a value and/or other information. Hash functions for one or more key-value pairs may be stored within electronic storage 128. The value may indicate the first output information set and/or a location within electronic storage 128 where first output information set is stored.

In some implementations, the provenance records may be outputted using a visual summary of the provenance information. The visual summary may include graphical summaries, image summaries, text summaries, and/or other types of visuals for portraying (i.e., summarizing) the provenance information. In some implementations, the visual summary of the provenance information may include user interface elements, and/or other components. Individual user interface elements may represent one or more of permissions information, version information, and/or other information. The user interface elements may represent the first processing step, the second processing step, and/or other information associated with processing the first input information set in accordance with the first computational workflow. The user interface elements may be capable of being selected by a user. Selection of one or more user interface elements may present information to the user (i.e., information associated with the user interface element), execute one or more programs associated with the user interface elements, and/or perform other actions.

Figure 3:
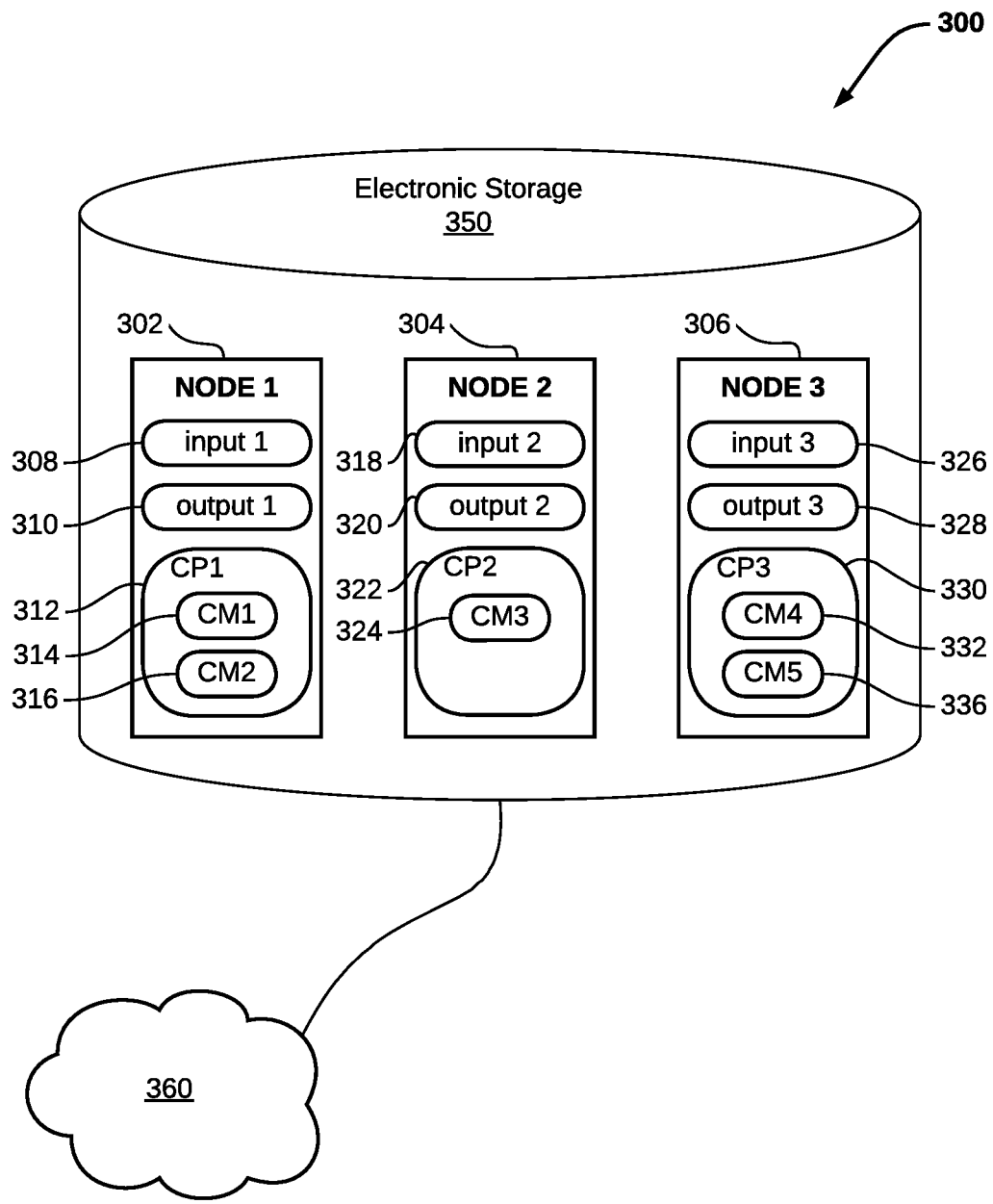
FIG. 3 illustrates an exemplary implementation of the system configured for generating a provenance record for processing information in accordance with a computational workflow, in accordance with one or more implementations.

FIG. 3 illustrates an exemplary implementation of a system configured for generating a provenance record for processing information in accordance with a computational workflow, in accordance with one or more implementations. FIG. 3 shows electronic storage 350 that may be similar to or the same as electronic storage 128 (shown in FIG. 1) and network(s) 360 that may be similar to or the same as network(s) 116 (as shown in FIG. 1). Electronic storage 350 may be configured to store one or more provenance records including first provenance record 302 (labeled "NODE 1"), second provenance record 304 (labeled "NODE 2"), third provenance record 306 (labelled "NODE 3"), and or other provenance records. The individual provenance records may be stored in electronic nodes, modules, packages, and/or other electronic formats. First provenance record 302 may include a first input information set 308 (and/or information derived from first input information set 308), a first output information set 310 (and/or information derived from first output information set 310), a first workflow definition 312 defining a first computational workflow, and/or other information. The first workflow definition 312 may include a first order of computational modules. The first order of computational modules may include first computational module 314, second computational module 316, and/or other computational modules. First provenance record 302 may be capable of facilitating replication of processing first input information set 308 in accordance with the first computational workflow to generate first output information set 310. Second provenance record 304 may include a second input information set 318 (and/or information derived from second input information set 318), a second output information set 320 (and/or information derived from second output information set 320), a second workflow definition 322 defining a second computational workflow, and/or other information. The second workflow definition 322 may include a second order of computational modules. The second order of computational modules may include third computational module 324 and/or other computational modules. Second provenance record 304 may be capable of facilitating replication of processing second input information set 318 in accordance with the second computational workflow to generate second output information set 320. Third provenance record 306 may include a third input information set 326 (and/or information derived from third input information set 326), a third output information set 328 (and/or information derived from third output information set 328), a third workflow definition 330 defining a third computational workflow, and/or other information. The third workflow definition 330 may include a third order of computational modules. The third order of computational modules may include fourth computational module 332, fifth computational module 336, and/or other computational modules. Third provenance record 306 may be capable of facilitating replication of processing third input information set 326 in accordance with the third computational workflow to generate third output information set 328. In some implementations, first provenance record 302, second provenance record 304, and/or third provenance record may be provided and/or outputted via network(s) 360.

Figure 4:
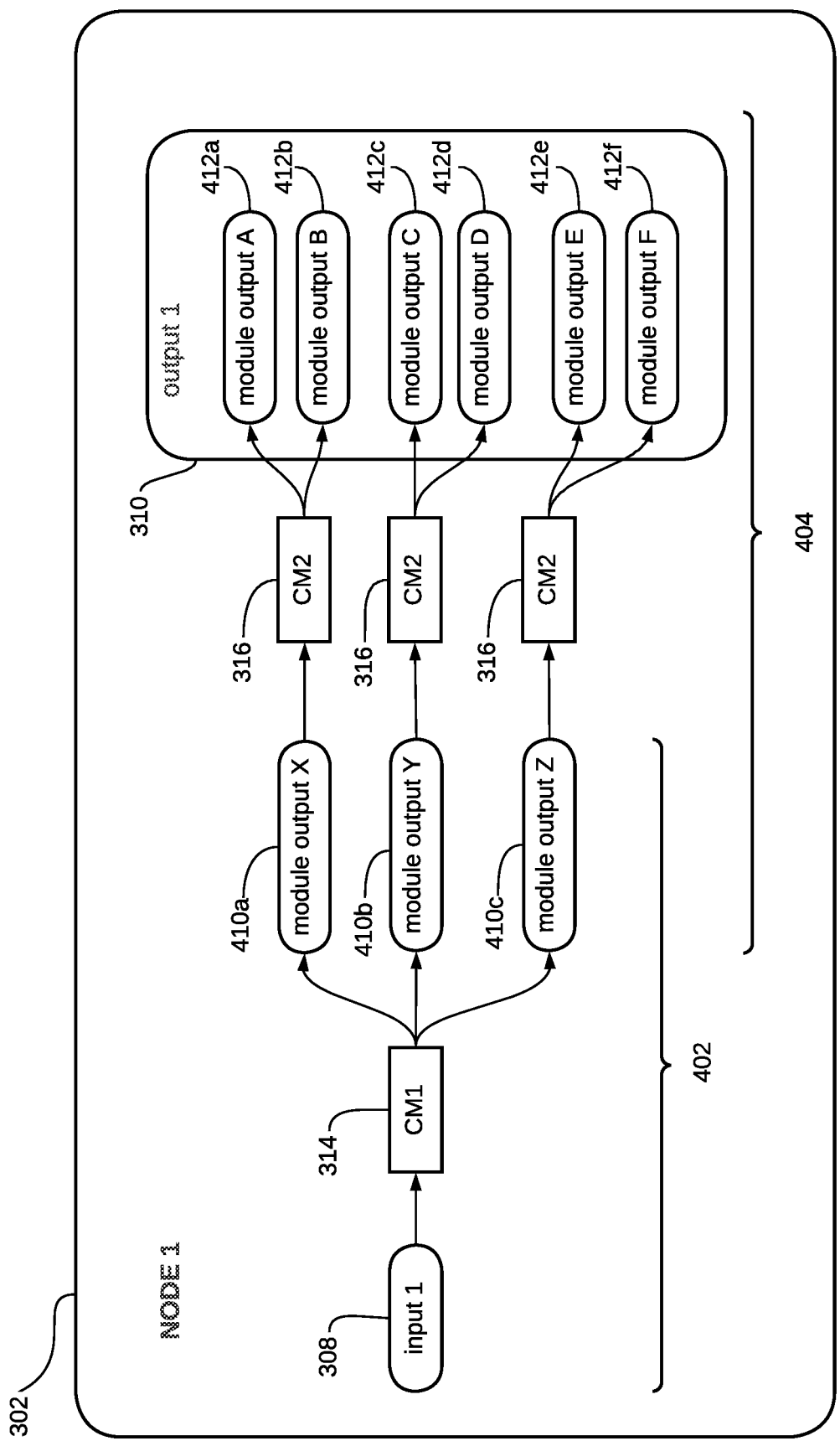
FIG. 4 illustrates an exemplary implementation of the system configured for generating a provenance record for processing information in accordance with a computational workflow, in accordance with one or more implementations.

FIG. 4 shows an alternative configuration of first provenance record 302 that may be stored in electronic storage 350 (as shown in FIG. 3). First provenance record may include a first processing step 402 (shown as a bracket), a second processing step 404 (shown as a bracket), and/or other processing steps. First processing step 402 may include providing first input information set 308 as module input to first computational module 314 to produce first module output 410a-c (labeled "module output X-Z"). Second processing step 404 may follow first processing step 402. Second processing step may include providing first module output 410a-c to second computational module 316 to produce second module output 412a-f. In some implementations, first output information set 310 may include second module output 412a-f as shown, however this is not intended to be limiting. By way of non-limiting illustration, first output information set may include individual ones of second module output 412a-f, parts of second module output 412a-f, and/or information derived from second module output 412a-f.

In some implementations, server(s) 102, client computing platform(s) 104, and/or external resources 126 may be operatively linked via one or more electronic communication links. By way of non-limiting illustration, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting illustration, the given client computing platform 104 may include one or more of a desktop computer, a laptop computer, a handheld computer, a tablet computing platform, a NetBook, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 126, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. By way of non-limiting illustration, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, By way of non-limiting illustration, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. By way of non-limiting illustration, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
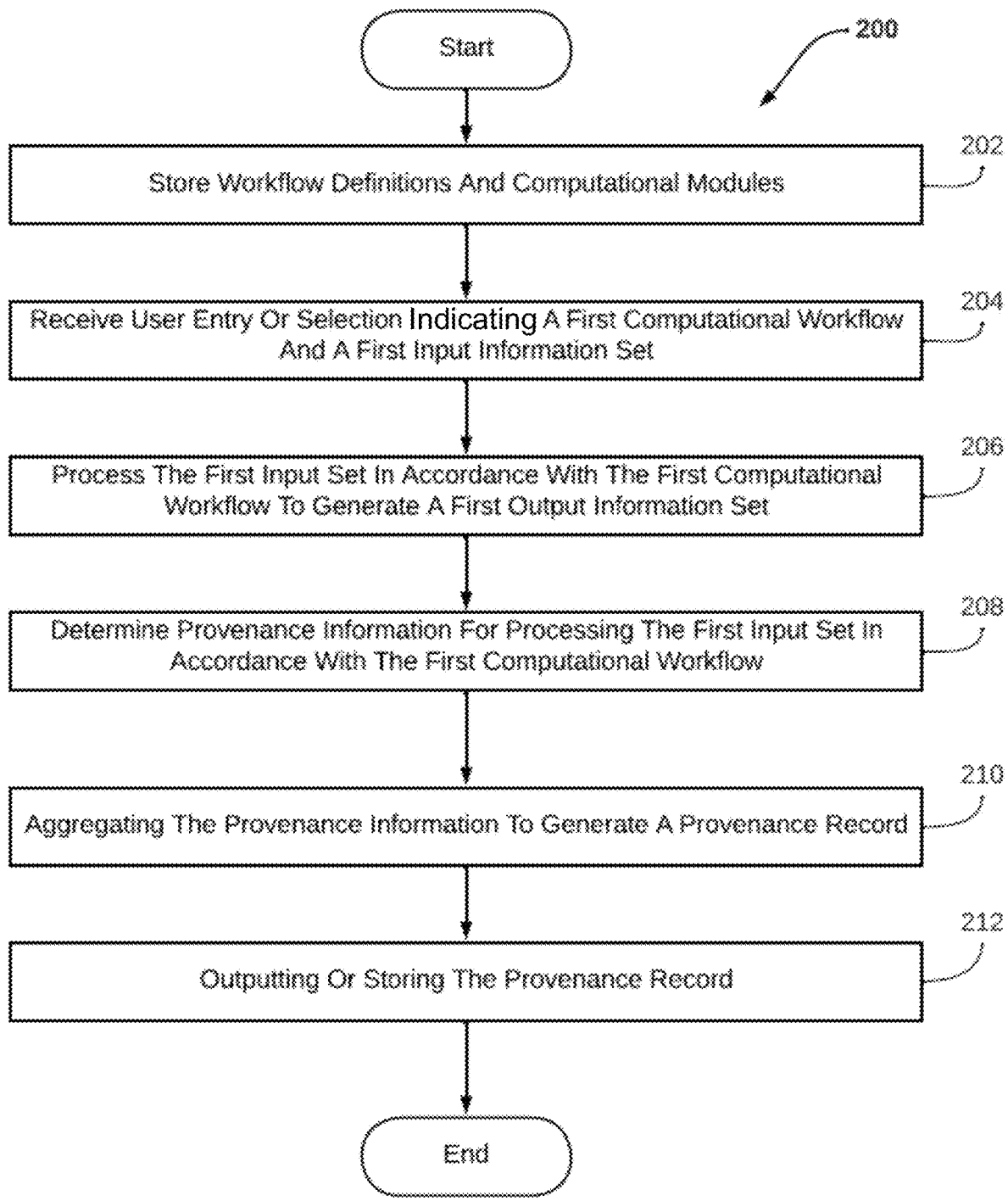
FIG. 2 illustrates a method for generating a provenance record for processing information in accordance with a computational workflow, in accordance with one or more implementations.

FIG. 2 illustrates a method 200 for generating a provenance record for processing information in accordance with a computational workflow, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing workflow definitions, computational modules, and/or other information. The workflow definitions may define computational workflows that process sets of input information to produce sets of output information. The individual workflow definitions may include orders of computational modules for the defined computational workflows. The computational modules may define separate sets of computational operations that are executable on module inputs to the computational modules to produce module outputs. The computational modules may include a first computational module, a second computational module, and/or other computational modules. The workflow definitions may include a first workflow definition that defines a first computational workflow, and/or other workflow definitions. The first workflow definition may define an order of computational modules that specifies the second computational module is subsequent and adjacent to the first computational module in the first computational workflow. Module outputs generated by the first computational module in the first computational workflow may be provided as module inputs to the second computational module. Operation 202 may be performed by electronic storage that is the same as or similar to electronic storage 128, in accordance with one or more implementations.

An operation 204 may include receiving user entry or selection indicating the first computational workflow, a first input information set, and/or other information. The first computational module of the first computational workflow may define a first set of operations to perform on module input to the first computational module. The second computational module of the first computational workflow may define a second set of operations to perform on module input to the second computational module. Operation 204 may be performed by one or more hardware processors configured by machine-readable instructions including a component that is the same as or similar to input component 108, in accordance with one or more implementations.

An operation 206 may include processing the first input information set in accordance with the first computational workflow to generate a first output information set. Processing may include a first processing step, a second processing step, and/or other processing steps. The first processing step may include providing the first input information set as module input to the first computational module to perform the first set of operations to produce first module output. The second processing step may include providing the first module output as module input to the second computational module to perform the second set of operations to produce second module output. The first output information set may include the second module output or information derived thereof. The first output information set may be provided as output for the first computational workflow. Operation 206 may be performed by one or more hardware processors configured by machine-readable instructions including a component that is the same as or similar to workflow component 110, in accordance with one or more implementations.

An operation 208 may include determining provenance information for processing the first input information set in accordance with the first computational workflow. The provenance information may specify the first processing step followed by the second processing step. The provenance information may include at least the first input information set, the first output information set, the first module output, the second module output, and/or other information. Operation 208 may be performed by one or more hardware processors configured by machine-readable instructions including a component that is the same as or similar to record component 112, in accordance with one or more implementations.

An operation 210 may include aggregating the provenance information to generate a provenance record. The provenance record may be capable of facilitating replication of processing the first input information set in accordance with the first computational workflow to generate the first output information set. Operation 210 may be performed by one or more hardware processors configured by machine-readable instructions including a component that is the same as or similar to record component 112, in accordance with one or more implementations.

An operation 212 may include outputting and/or storing the provenance record. Operation 212 may be performed by one or more hardware processors configured by machine readable instructions including a component that is the as or similar to output component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. By way of non-limiting illustration, it is to be understood that the present technology contemplates that, to the extent possible, one or more features of any implementation can be combined with one or more features of any other implementation.

What is claimed:

1. A system configured to generate a provenance record for processing information in accordance with a computational workflow, the system comprising:

electronic storage configured to store workflow definitions and computational modules, the workflow definitions defining computational workflows that process sets of input information to produce sets of output information, the individual workflow definitions including orders of computational modules for the defined computational workflows, the computational modules defining separate sets of computational operations that are executable on module inputs to the computational modules to produce module outputs, wherein the computational modules include a first computational module and a second computational module, wherein the workflow definitions include a first workflow definition that defines a first computational workflow, the first workflow definition defining an order of computational modules that specifies the second computational module is subsequent and adjacent to the first computational module in the first computational workflow such that module outputs generated by the first computational module in the first computational workflow are provided as module inputs to the second computational module;

one or more physical processors configured by machine-readable instructions to:

receive user entry or selection indicating the first computational workflow and a first input information set, wherein the first computational module of the first computational workflow defines a first set of operations to perform on module input to the first computational module, and wherein the second computational module of the first computational workflow defines a second set of operations to perform on module input to the second computational module;

process the first input information set in accordance with the first computational workflow to generate a first output information set, wherein the processing of the first input information set includes a first processing step of providing the first input information set as module input to the first computational module to perform the first set of operations to produce first module output, wherein the processing of the first input information set further includes a second processing step of providing the first module output as module input to the second computational module to perform the second set of operations to produce second module output, and wherein the first output information set includes the second module output or information derived thereof and is provided as output for the first computational workflow;

determine provenance information for the processing of the first input information set in accordance with the first computational workflow, wherein the provenance information specifies the first processing step followed by the second processing step, wherein the provenance information includes at least the first input information set, the first output information set, the first module output, and the second module output;

aggregate the provenance information to generate a provenance record, wherein the provenance record is capable of facilitating replication of the processing of the first input information set in accordance with the first computational workflow to generate the first output information set;

output or store the provenance record.

2. The system of claim 1, wherein the provenance record includes version information associated with one or more of the first computational workflow, the first computational module, or the second computational module.

3. The system of claim 1, wherein the provenance record includes permissions information associated with one or more of the first input information set, the first computational workflow, the first computational module, or the second computational module.

4. The system of claim 1, wherein the first output information set includes multiple prospective final outputs for the first computational workflow.

5. The system of claim 4, wherein the one or more physical processors are further configured by machine readable instructions to:

receive user input selecting at least one of the multiple prospective final outputs for final output of the first computational workflow, and wherein the provenance record includes information associated with selection of the final output.

6. The system of claim 1, wherein the first computational module and the second computational module have input format requirements for module inputs, wherein the first module output satisfies the input format requirements of the second computational module.

7. The system of claim 1, wherein the provenance record may be provided as training to data to train a machine learning model to generate one or more provenance records for processing of other input information sets in accordance with one or more other computational workflows, and wherein the machine learning model is stored in electronic storage.

8. The system of claim 1, wherein the first input information set and the first output information set include genomic information that defines one or more nucleotide sequences.

9. The system of claim 1, wherein the first computational module and/or the second computational module include sets of operations for converting module inputs from a first format to a second format.

10. The system of claim 1, wherein the provenance record is stored in a machine readable or a human readable format.

11. A method for generating a provenance record for processing information in accordance with a computational workflow, the method comprising:

storing workflow definitions and computational modules, the workflow definitions defining computational workflows that process sets of input information to produce sets of output information, the individual workflow definitions including orders of computational modules for the defined computational workflows, the computational modules defining separate sets of computational operations that are executable on module inputs to the computational modules to produce module outputs, wherein the computational modules include a first computational module and a second computational module, wherein the workflow definitions include a first workflow definition that defines a first computational workflow, the first workflow definition defining an order of computational modules that specifies the second computational module is subsequent and adjacent to the first computational module in the first computational workflow such that module outputs generated by the first computational module in the first computational workflow are provided as module inputs to the second computational module;

receiving user entry or selection indicating the first computational workflow and a first input information set, wherein the first computational module of the first computational workflow defines a first set of operations to perform on module input to the first computational module, and wherein the second computational module of the first computational workflow defines a second set of operations to perform on module input to the second computational module;

processing of the first input information set in accordance with the first computational workflow to generate a first output information set, wherein the processing of the first input information set includes a first processing step of providing the first input information set as module input to the first computational module to perform the first set of operations to produce first module output, wherein the processing of the first input information set further includes a second processing step of providing the first module output as module input to the second computational module to perform the second set of operations to produce second module output, and wherein the first output information set includes the second module output or information derived thereof and is provided as output for the first computational workflow;

determining provenance information for the processing of the first input information set in accordance with the first computational workflow, wherein the provenance information specifies the first processing step followed by the second processing step, wherein the provenance information includes at least the first input information set, the first output information set, the first module output, and the second module output;

aggregating the provenance information to generate a provenance record, wherein the provenance record is capable of facilitating replication of the processing of the first input information set in accordance with the first computational workflow to generate the first output information set;

outputting or storing the provenance record.

12. The method of claim 11, wherein the provenance record includes version information associated with one or more of the first computational workflow, the first computational module, or the second computational module.

13. The method of claim 11, wherein the provenance record includes permissions information associated with one or more of the first input information set, the first computational workflow, the first computational module, or the second computational module.

14. The method of claim 11, wherein the first output information set includes multiple prospective final outputs for the first computational workflow.

15. The system of claim 14, wherein the method further includes:

receiving user input selecting at least one of the multiple prospective final outputs for final output of the first computational workflow, and wherein the provenance record includes information associated with selection of the final output.

16. The method of claim 11, wherein the first computational module and the second computational module have input format requirements for module inputs, wherein the first module output satisfies the input format requirements of the second computational module.

17. The method of claim 11, wherein the provenance record is provided as training to data to train a machine learning model to generate one or more provenance records for processing of other input information sets in accordance with one or more other computational workflows, and wherein the method further include storing the machine learning model.

18. The method of claim 11, wherein the first input information set and the first output information set include genomic information that defines one or more nucleotide sequences.

19. The method of claim 11, wherein the first computational module and/or the second computational module include sets of operations for converting module inputs from a first format to a second format.

20. The method of claim 11, wherein the provenance record is stored in a machine readable or a human readable format.

* * * * *